(12) United States Patent
Graefenhain

(10) Patent No.: US 7,067,825 B2
(45) Date of Patent: Jun. 27, 2006

(54) EYE PROTECTION SYSTEM ON AN ELECTRONICALLY CONTROLLED FLUORESCENCE MICROSCOPE

(75) Inventor: Paul Graefenhain, Balgach (CH)

(73) Assignee: Leica Microsystems (Schweiz) AG, Heerbrugg (CH)

(*) Notice: Subject to any disclaimer, the term of this patent is extended or adjusted under 35 U.S.C. 154(b) by 201 days.

(21) Appl. No.: 10/692,368

(22) Filed: Oct. 23, 2003

(65) Prior Publication Data

US 2004/0079894 A1  Apr. 29, 2004

(30) Foreign Application Priority Data

Oct. 23, 2002  (DE) .................................. 102 49 526

(51) Int. Cl.
*G01N 21/64* (2006.01)

(52) U.S. Cl. .................... 250/458.1; 250/309; 359/380

(58) Field of Classification Search ............. 250/458.1, 250/459.1, 231.15, 232, 309, 311; 359/385, 359/386, 380
See application file for complete search history.

(56) References Cited

U.S. PATENT DOCUMENTS

| 4,756,611 A | * | 7/1988 | Yonekubo et al. | .......... 359/370 |
| 5,841,577 A | * | 11/1998 | Wachman et al. | .......... 359/386 |
| 6,104,945 A | * | 8/2000 | Modell et al. | ............. 600/473 |
| 6,472,657 B1 | * | 10/2002 | Miles et al. | .......... 250/231.15 |
| 6,563,113 B1 | | 5/2003 | Amann et al. | ............. 250/309 |

FOREIGN PATENT DOCUMENTS

EP  1 010 030  11/2001

\* cited by examiner

*Primary Examiner*—David Porta
*Assistant Examiner*—Faye Polyzos
(74) *Attorney, Agent, or Firm*—Simpson & Simpson, PLLC

(57) ABSTRACT

The invention concerns a fluorescence (stereo)microscope having a filter carrier that can be loaded with manually exchangeable filter inserts, and having a reliable eye protection system against the energy-rich light radiation in the context of a carrier position without a filter insert.

38 Claims, 2 Drawing Sheets

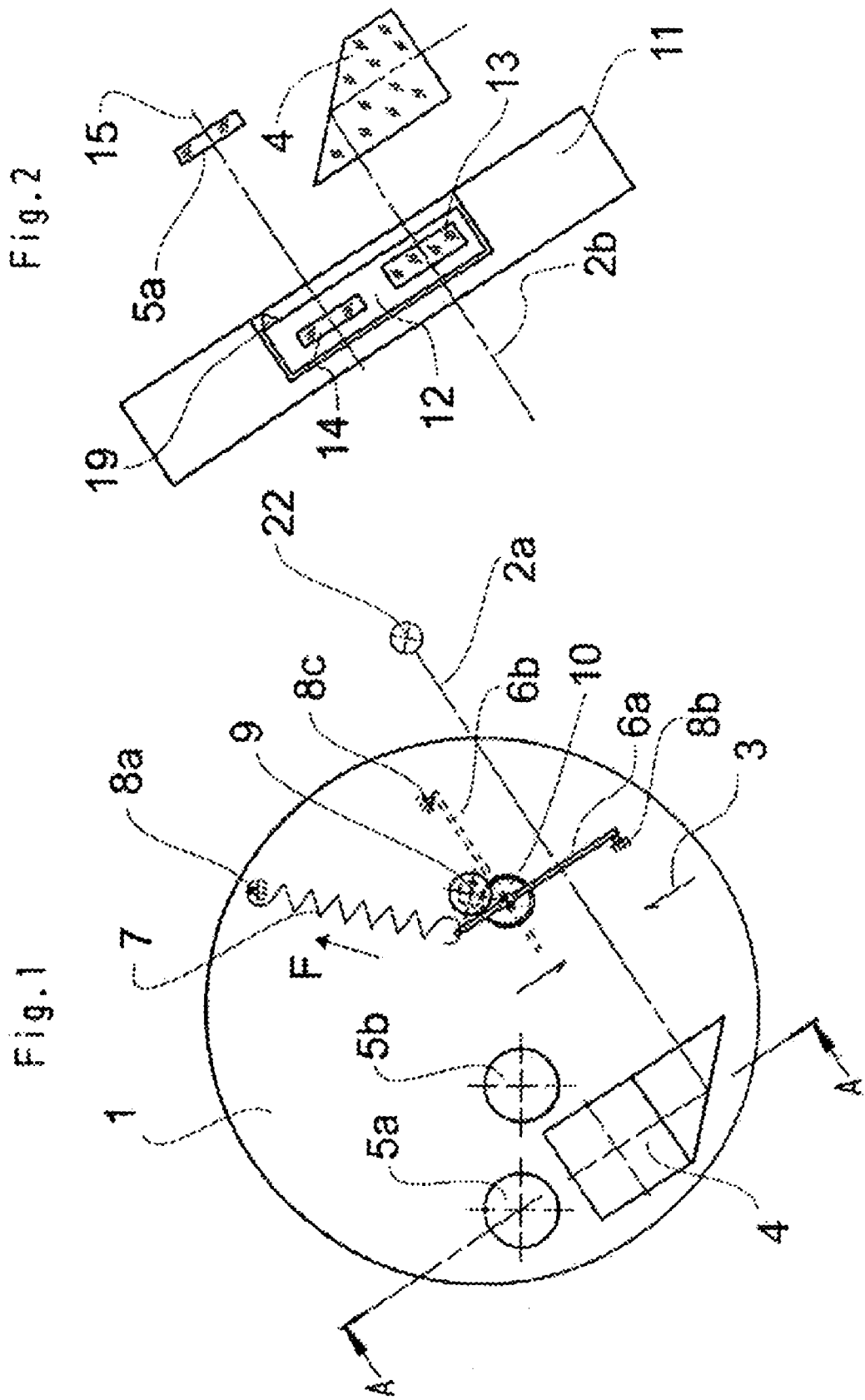

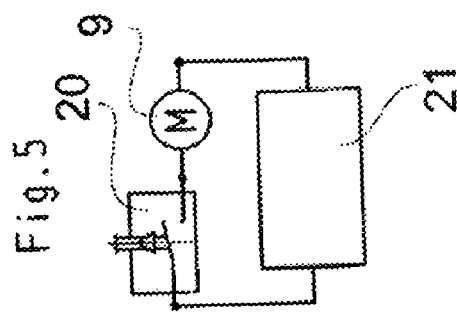
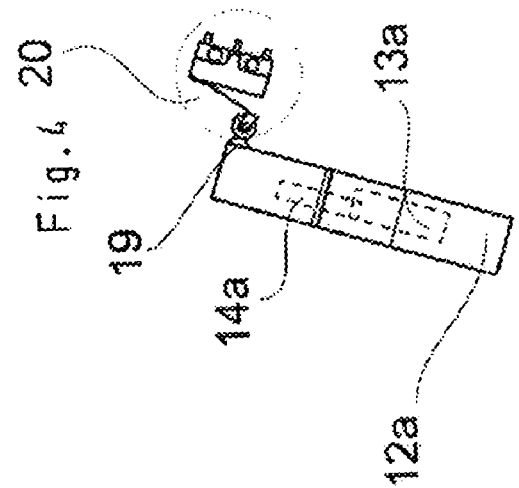
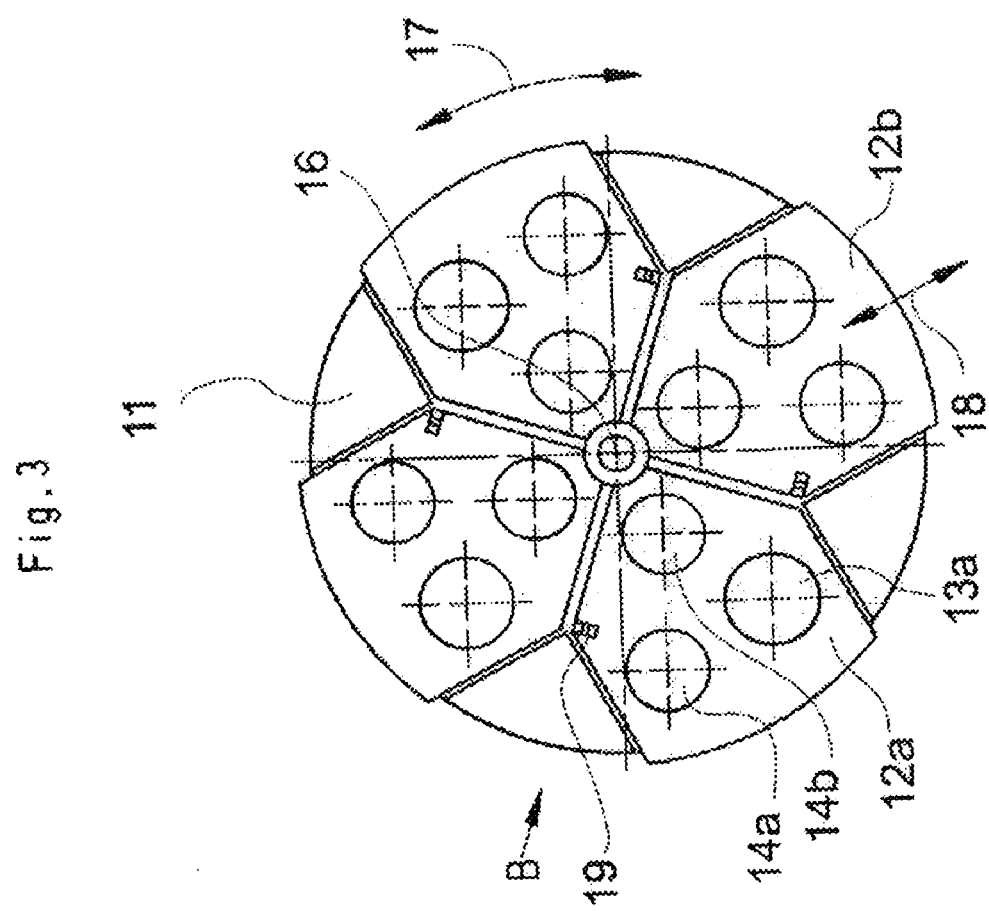

EYE PROTECTION SYSTEM ON AN ELECTRONICALLY CONTROLLED FLUORESCENCE MICROSCOPE

CROSS REFERENCE TO RELATED APPLICATIONS

This application claims priority of German patent application 102 49 526.2 which is incorporated by reference herein.

FIELD OF THE INVENTION

The invention concerns an eye protection system on an electronically controlled fluorescence microscope.

BACKGROUND OF THE INVENTION

Fluorescence (stereo)microscopes that are equipped with high-output illumination devices which also emit in the ultraviolet spectral region are known. In addition to exclusively UV-protective filters in the observation beam path, further filter combinations are used as excitation filters in the illumination beam path in order to isolate the wavelength(s) necessary for the particular fluorochrome, and as barrier filters in the observation beam path in order to block that same excitation light. These matched filter combinations are preferably incorporated into changeable modules, so that a rapid changeover between different fluorescent excitation illuminations is possible.

An even faster changeover is made possible by the fact that filter inserts freely selectable by the user are introduced into a magazine switchable in manual or motorized fashion, or into a turret. Positions not loaded with filter combinations must be equipped by the user with so-called "dummies" that interrupt or attenuate the illuminating beam path, in order to prevent damage to the eyes or to an image recording device due to the unfiltered high light intensity.

Also belonging to the existing art is a mechanical device (blocking slider), described in EP-B1-1 010 030, for interrupting the illumination beam path during breaks in observation. This prevents bleaching of the observed specimens with no need to switch off the illumination device. A shutter, motion-coupled in accordance with EP-B1-1 010 030 to the changeable filter carrier, interrupts the beam path during the switchover, and clears it again in the individual working positions.

With the apparatuses described above, the microscope user is still not dependably protected from a situation in which a position of the changeable filter carrier not loaded with a filter insert is engaged, and a very high light intensity can travel onto the specimen and into the observer's eye and an image recording device.

SUMMARY OF THE INVENTION

It is thus the object of the invention to describe an eye protection apparatus that always and reliably protects observers' eyes or an imaging camera or the like. The intention is that upon exchange of the filter inserts, no eye-damaging light is perceptible in and outside the microscope.

The object is achieved by way of the features of Claim 1, specifically in that as a result of an embodiment according to the present invention, no excitation light emerges from the illumination device if a filter insert is not inserted in the fluorescence microscope.

In order to improve ergonomics and productivity, a further development provides for electronically controlling, by means of a control unit, the switchover of a filter turret and the illumination duration. Control can be accomplished by means of a special operating unit or via a computer, thereby making possible e.g. automated acquisition of image series with varying fluorescent light excitations. Because of the electrical switchover and the consequent absence of manual contact with the filter turret, however, there is an increased risk that a position of the filter turret loaded neither with a filter insert nor with a dummy will be brought unnoticed into the beam path, and the path then cleared.

A concrete embodiment of the invention provides that a fluorescence (stereo)microscope having an electronically controlled changeover system between several positions, respectively loaded with excitation and barrier filters, of a magazine (filter turret, changeable filter carrier) for manually insertable filter inserts, is equipped with a shutter, closed in the idle state by a force, in the illumination beam path that can be opened electrically (e.g. by means of a motor or electromagnet) by overcoming the force. Upon interruption of the current flow, this shutter is automatically closed again by the force. In the exemplary embodiment shown, a closing force F is generated by a spring. Mechanical closing of the shutter can, however, also be achieved by the action of gravity, the magnetic force of permanent magnets, or the recovery force of elastic materials.

For the situation in which, for example owing to operator error, a position without a filter insert is switched into the beam path, danger to the eye (dazzling) as a result of electrical opening of the shutter is prevented, regardless of any electronic functions or malfunctions, by the fact that if no filter insert is present in the beam path, the necessary electrical circuit is automatically interrupted in mechanical or electrical fashion.

According to the present invention, this is achieved in a particular embodiment by the fact that the electrical circuit for electrically opening the shutter and holding it open is closed only by a filter insert present in the beam path, an additional switching device connected in series with this safety device permitting arbitrary closing of the shutter.

In an exemplary embodiment, a cam on the filter insert actuates a sensitive microswitch with a closing function when the filter insert is present in the beam path.

Similarly, a permanent magnet on the filter insert can close a magnetic switch (reed contact).

Further variants are obtained when electrically conductive contact surfaces on the filter holder or on the filters directly close the electrical circuit in the working position.

Above and beyond its application in fluorescence microscopes and in particular stereomicroscopes, this functional principle can be used wherever a danger to an observer's eye may exist as a result of the absence of components in the optical beam path.

Further embodiments of the invention are described in the Figures and the Claims. The Parts List, the Figures, and the Claims are thus a constituent of the disclosure.

BRIEF DESCRIPTION OF THE DRAWINGS

The invention will be explained in more detail, symbolically and by way of example, with reference to Figures.

The Figures are described in interconnected and overlapping fashion. Identical reference characters denote identical components; reference characters having different indices indicate functionally identical components.

In the drawings:

FIG. 1 is a schematic plan view of an illumination device according to the present invention of a fluorescence stereomicroscope, having the shutter described;

FIG. 2 is a schematic section along A—A in FIG. 1;

FIG. 3 is a plan view of a completely loaded filter turret;

FIG. 4 shows the coaction between a cam on the filter insert present in the beam path and a sensitive microswitch (closed switch position), viewed in direction B as shown in FIG. 3; and FIG. 5 schematically shows the electrical operating mode.

DETAILED DESCRIPTION OF THE INVENTION

FIG. 1 schematically depicts the construction of an illumination device 1, illustrating how an illumination beam path 2b with its optical axis 2a, which proceeds from a light source 22, would be closed in shutter position 6a that is depicted, but open in shutter position 6b that is drawn with dashed lines. In the open position, the illumination beam path with its optical axis 2a is guided through an aperture 3 and deflected by a deflection prism 4 into an excitation filter 13 (not depicted here) of a filter insert 12 (FIG. 2). A motor with pinion 9 engages into a drive gear 10 on shutter 6 and moves it between stop points 8b and 8c. Shutter 6 is moved in spring-reinforced fashion by means of spring 7, which is attached to spring suspension 8a. The spring pulls shutter 6 into closed position 6a with a force F.

Also depicted are UV filters 5a, b through which observation beam paths pass, and section lines A—A which indicate the lateral sectioned depiction of FIG. 2.

FIG. 2 schematically depicts the construction of a filter turret 11 into which a filter insert 12 is slid. The manner in which illumination beam path 2b and one of the observation beam paths 15 (the second is concealed) pass through filter insert 12 is depicted here. Illumination beam path 2b is directed by a deflection prism 4 onto an excitation filter 13. The function of this filter is to block that light wave range in which the fluorescent light perceptible by the observer lies.

Observation beam path 15 passes through barrier filters 14 (only one of which is depicted; the other is concealed) which limit the incident light wave range only to the desired fluorescent light coming from the specimen, and then, for additional safety, through a respective UV filter 5, before traveling into the observer's eyes.

FIG. 3 shows a filter turret 11 having filter inserts 12 according to the present invention which are equipped with excitation filters 13 and barrier filters 14 and with cams 19 according to the present invention. The filter inserts are slid in insertion direction 18 onto filter turret 11, and the latter can be rotated in rotation direction 17 about rotation axis 16. Directional arrow B indicates the direction from which FIG. 4 must be viewed.

FIG. 4 schematically depicts a filter insert 12a in the working position, closing sensitive microswitch 20 with a cam 19.

FIG. 5 illustrates the general principle of operation of the electrical circuit. Control device 21 supplies motor 9 with current, to open shutter 6 and hold it open, only when sensitive microswitch 20 is closed by cam 19 of a filter insert 12a that is in the working position. When the circuit is closed, motor 9 overcomes force F that closes shutter 6, and thus holds it open. If the circuit is interrupted by the opening of switch 20, force F causes shutter 6 to close immediately irrespective of control device 21; motor 9, which is currentless and coupled to the shutter, is also rotated.

| PARTS LIST |
| --- |
| 1 Illumination device |
| 2 Optical axis of illumination beam path |
| 3 Aperture |
| 4 Deflection prism |
| 5 UV filter |
| 6a Shutter (closed) |
| 6b Shutter (open) |
| 7 Spring |
| 8 Spring suspension and stop points |
| 9 Motor or electromagnet with pinion |
| 10 Drive gear on shutter |
| 11 Filter turret |
| 12 Filter insert |
| 12a Filter insert in beam path |
| 12b Filter insert in exchange position |
| 13 Excitation filter |
| 14 Barrier filter |
| 15 Optical axis of an observation beam path |
| 16 Rotation axis of filter turret |
| 17 Motion of filter turret upon switchover between different positions |
| 18 Insertion direction upon exchange of a filter insert |
| 19 Cam on filter insert |
| 20 Sensitive microswitch with closing function |
| 21 Control unit |
| 22 Light source |
| F Force |
| B Viewing direction for FIG. 4 |

What is claimed is:

1. A fluorescence microscope having at least one exchangeable filter insert (12) and at least one illumination device (1) having at least one light source (22), wherein the filter insert (12) is coupled by means of a coupling apparatus (19) to the illumination device (1) so that in an operating state no excitation illumination occurs in the fluorescence microscope without said filter insert (12) in a working position, and wherein upon insertion of the filter insert (12), a dimmer for the excitation light source (22) is switchable by insertion or removal of the filter insert (12) by means of the coupling apparatus (19).

2. The fluorescence microscope as defined in claim 1, wherein in the operating state, current delivery to the excitation light source (22) is switchable by means of the coupling apparatus (19) by insertion or removal of the filter insert (12).

3. The fluorescence microscope as defined in claim 2, wherein in the event of a power failure at the microscope, current delivery to the excitation light source is automatically switched off.

4. The fluorescence microscope as defined in claim 2, wherein said coupling apparatus (19) is a mechanical apparatus.

5. The fluorescence microscope as defined in claim 2, where said coupling apparatus (19) is an electrical apparatus.

6. The fluorescence microscope as defined in claim 2, wherein said coupling apparatus (19) is an optical apparatus.

7. The fluorescence microscope as defined in claim 2, wherein said coupling apparatus (19) is a magnetic apparatus.

8. The fluorescence microscope as defined in claim 2, wherein upon insertion of the filter insert (12), a dimmer for the excitation light source (22) is switchable by insertion or removal of the filter insert (12) by means of the coupling apparatus (19).

9. The fluorescence microscope as defined in claim 2, wherein upon insertion of the filter insert (12), a shutter (6) for the illumination beam path (2b) is switchable by insertion or removal of the filter insert (12) by means of the coupling apparatus (19).

10. The fluorescence microscope as defined in claim 1, wherein upon insertion of the filter insert (12), a shutter (6) for an illumination beam path (2b) is switchable by insertion or removal of the filter insert (12) by means of the coupling apparatus (19).

11. The fluorescence microscope as defined in claim 10, wherein in the operating state the shutter (6) is switchable by means of an electric motor (9).

12. The fluorescence microscope as defined in claim 11, wherein in the operating state the shutter (6) can be opened and held open by means of the electric motor (9) only when the electrical circuit necessary therefor is closed by the apparatus (19).

13. The fluorescence microscope as defined in claim 10, wherein in the event of a power failure at the microscope, the shutter (6) is automatically closed.

14. The fluorescence microscope as defined in claim 13, wherein the shutter (6) is closable by force of gravity.

15. The fluorescence microscope as defined in claim 13, wherein the shutter (6) is closable by means of elastic materials.

16. The fluorescence microscope as defined in claim 13, wherein the shutter (6) is closable by magnetic force.

17. The fluorescence microscope as defined in claim 10, wherein the shutter (6) is closable by the force F of a spring (7).

18. The fluorescence microscope as defined in claim 10, wherein the shutter (6) is closable by the force of gravity.

19. The fluorescence microscope as defined in claim 10, wherein the shutter (6) is closable by means of elastic materials.

20. The fluorescence microscope as defined in claim 10, wherein the shutter (6) is closable by magnetic force.

21. The fluorescence microscope as defined in claim 10, wherein the shutter (6) is embodied as a rotary slide.

22. The fluorescence microscope as defined in claim 10, wherein the shutter (6) is embodied as a linear mechanical stop.

23. The fluorescence microscope as defined in claim 10, wherein in the operating state the shutter (6) is switchable by means of an electromagnet.

24. The fluorescence microscope as defined in claim 23, wherein in the operating state the shutter (6) can be opened and held open by means of the electromagnet only when the electrical circuit necessary therefor is closed by the apparatus (19).

25. The fluorescence microscope as defined in claim 13, wherein the shutter (6) is closable by the spring (7).

26. The fluorescence microscope as defined in claim 10, wherein the shutter (6) is embodied as a rotary mechanical stop.

27. The fluorescence microscope as defined in claim 1, wherein in the event of a power failure at the microscope, the dimmer for the excitation light source is automatically switched on.

28. The fluorescence microscope as defined in claim 1, wherein at least two filter inserts (12) are arranged on a changeable filter carrier, e.g., a filter turret (11).

29. The fluorescence microscope as defined in claim 28, wherein different filter inserts (12) can be brought into a working position by manual switching of the changeable filter turret (11).

30. The fluorescence microscope as defined in claim 28, wherein at least two filter inserts (12) can be brought into the working position by motorized switching of the changeable filter turret (11).

31. The fluorescence microscope as defined in claim 1, wherein the filter insert (12) is constituted from a combination of several individual filters (13, 14).

32. The fluorescence microscope as defined in claim 31, wherein at least one of the filters (13, 14) is equipped with an electrically conductive coating which acts, in the operating state, as a switch (20).

33. The fluorescence microscope as defined in claim 1, wherein the filter insert (12) is embodied with at least one optical signal generator which makes the switch (20) switchable.

34. The fluorescence microscope as defined in claim 1, wherein the filter insert (12) is embodied with at least one switching cam (19) which actuates a sensitive microswitch (20) with a closing function.

35. The fluorescence microscope as defined in claim 1, wherein the filter insert (12) is equipped with at least one permanent magnet which, in the operating state, actuates a magnetic switch with a closing function.

36. The fluorescence microscope as defined in claim 1, wherein the filter insert (12) is equipped with at least one electrically conductive contact surface which acts, in the operating state, as a switch (20).

37. The fluorescence microscope as defined in claim 1, wherein the shutter (6) is arranged in an observation beam path (15).

38. The fluorescence microscope as defined in claim 1, wherein said fluorescence microscope is a stereomicroscope.

* * * * *